(No Model.)
E. W. COMEGYS.
CORN SHOCKER.
No. 326,403.    Patented Sept. 15, 1885.
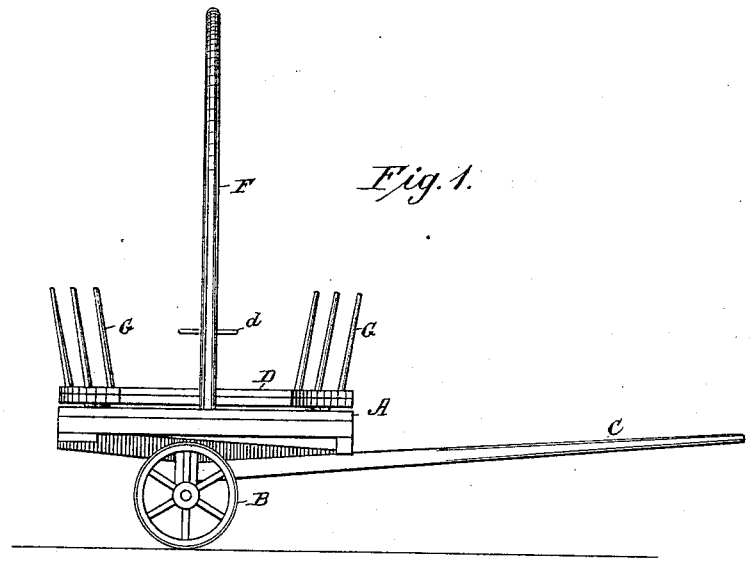
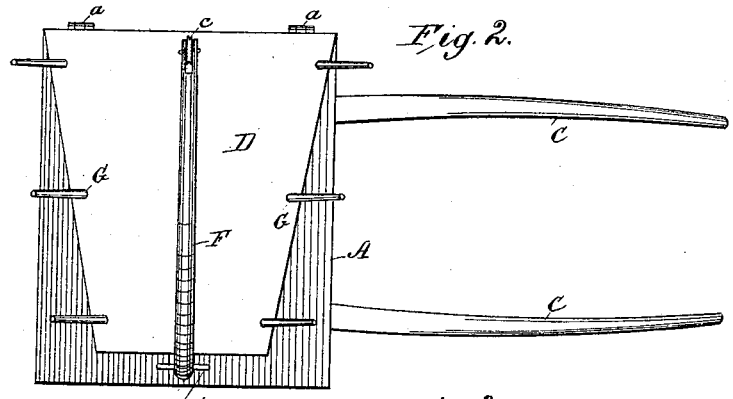
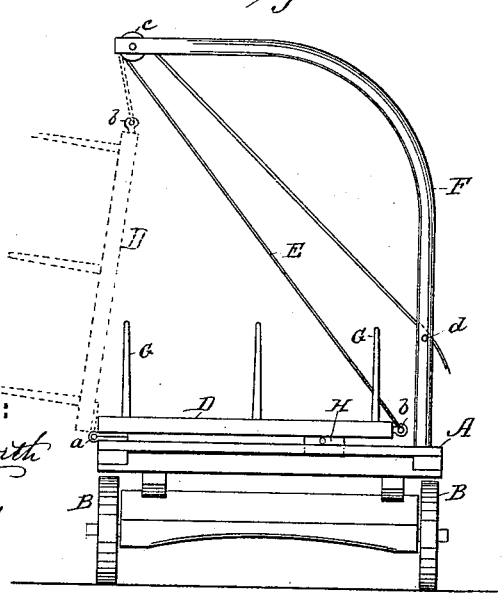
WITNESSES:
W. W. Hollingsworth
W. X. Stevens
INVENTOR:
E. W. Comegys
BY Munn & Co.
ATTORNEYS.

UNITED STATES PATENT OFFICE.

EDWARD WILLIAM COMEGYS, OF EDESVILLE, MARYLAND.

CORN-SHOCKER.

SPECIFICATION forming part of Letters Patent No. 326,403, dated September 15, 1885.

Application filed April 5, 1884. (No model.)

*To all whom it may concern:*

Be it known that I, EDWARD WILLIAM COMEGYS, a citizen of the United States, residing at Edesville, in the county of Kent and State of Maryland, have invented certain new and useful Improvements in Corn-Shockers, of which the following is a description.

The object of this invention is to gather corn and stalks on the field, either at the time of cutting or afterward, to hold the same while being tied into bundles, to carry the bundle to the shock, and to stand it up against the shock.

To this end the invention consists in the construction and combination of parts forming a corn-shocker, hereinafter described and claimed, reference being had to the accompanying drawings, in which—

Figure 1 is a side elevation of my invention. Fig. 2 is a plan view, and Fig. 3 is a rear elevation, of the same.

A represents the body of the machine, consisting of a platform mounted on truck wheels B, and provided with thills C, by which the shocker may be drawn either by a man or by a horse.

D is a leaf, hinged to the body A at $a$ to lie flat on the body, or to be raised to a vertical position. To this end a rope, E, is attached at one end to the leaf by means of an eyebolt, $b$, and passes up over a pulley, $c$, in a davit, F. This davit is made of iron, secured fast at its lower end in the body A, and curved upward to a point over the hinges $a$, at which point the pulley $c$ is mounted. A pin, $d$, is provided, to which the rope E may be fastened.

G represents stakes in the leaf to hold the cornstalks while gathering a load. This leaf may be large enough to carry a bundle or a whole shock.

In operation the corn is placed on the leaf of the shocker in a horizontal position, where its tops may be tied with twine from a ball carried in a drawer, H, beneath the leaf. Then the shocker, with its load, is drawn to the position where the shock is to be made, the end $f$ of the rope is drawn downward to raise the leaf, and the corn is thereby stood upon its butt-ends on the ground. If the shock is to be enlarged, the same operation will be repeated, either by gathering the corn as fast as it is cut by the reapers or by gathering it at bunches previously laid on the field. By means of the leaf, the davit, and the rope a large shock of corn may be stood on end at one move.

What I claim as my invention, and desire to secure by Letters Patent, is—

The combination, with the body A, mounted on wheels, of the leaf D, hinged at one edge to the body, the davit F, mounted on said body, the pulley therein, and the rope over said pulley and attached to the leaf, as and for the purpose specified.

EDWARD WILLIAM COMEGYS.

Witnesses:
 JOHN WARD COMEGYS,
 BARTON C. LEEJOY.